2,950,273
PROCESS FOR THE PRODUCTION OF SYMMETRICAL AND UNSYMMETRICAL AZO COMPOUNDS

Willibald Pelz, Opladen, Germany, assignor to AGFA Aktiengesellschaft, Leverkusen, Germany, a corporation of Germany No Drawing. Filed Nov. 13, 1957, Ser. No. 696,033

Claims priority, application Germany Nov. 20, 1956

7 Claims. (Cl. 260—144)

This invention relates to a process for the production of symmetrical and unsymmetrical azo compounds by reacting azides with compounds which contain reactive groups, especially methylene groups or methine groups. The methylene group can be in an open chain, such as for example in—cyanacetophenone, acylacetic acid and derivatives such as esters or amides, malonic acid derivatives, cyanacetic acid derivatives, 1.3-diketones, or in an isocyclic or heterocyclic ring, such as for example in pyrazolones, isoxazolones, 1,2,3-triazolones, indandiones, coumaranones, rhodanines, oxythionaphthenes, or can stand isolated, as for example in 1,3,3-trimethyl methylene indoline or heterocyclic compounds containing an active methyl group, such as quaternary salts of 2-methylbenzthiazole, 2-methyloxazole, 2-methylimidazole, 2- or 4-methylpyridines or quinolines, or be in a compound with phenolic groups, such as for example in a phenol, a substituted phenol such as resorcinol, naphthol or substituted naphthols.

The azides to be used in the process have the general formula $RN_3$, in which

R = a substituted or unsubstituted aliphatic radical, for example methyl, ethyl, propyl, butyl, isobutyl, or an allyl radical,
= an aromatic radical, for example phenyl or a substituted phenyl,
= an aralkyl radical, for example benzyl,
= a cyclo-aliphatic radical, for example cyclohexyl,
= a heterocyclic radical, for example 2-benthiazolyl,
= an acyl radical, for example —$CONH_2$, it being possible for one or both of the hydrogen atoms to be substituted by any desired organic radicals, for example alkyl, aryl, cycloalkyl or aralkyl,
= a sulphonyl radical, for example of the general formula $Z.SO_2$, in which Z is a substituted or unsubstitude alkyl, for example methyl, ethyl, isobutyl, an allyl, a substituted or unsubstituted aryl, for example phenyl, tolyl, an aralkyl, for example benzyl, a cycloalkyl or a heterocyclic radical, or a radical of the formula:

in which $R_1$ and $R_2$ represent like or different substituents, for example alkyl, aryl, aralkyl or cycloalkyl radicals.

The reaction may be carried out in aqueous medium or in an organic medium, for example in an alcohol such as methanol or ethanol, a ketone such as acetone, a hydrocarbon such as benzene, an amine such as pyridine, piperidine or triethylamine, or in any suitable organic medium. The reaction temperature can be varied from temperatures below 0° C. to the boiling point of the reaction medium which is used. The pH value of the reaction medium can be varied from weakly acid to strongly alkaline, and is preferably adjusted to 5–12. If desired, the production of the azo compound and the production of the azide to be introduced can take place in a single stage.

The reaction probably proceeds in accordance with the following equation:

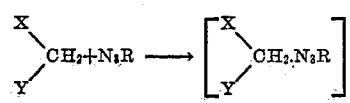

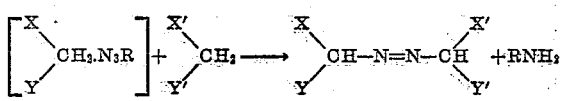

in which R has the significance described above and X and Y or X' and Y' can be like or different electron acceptors, such for example as —CH=CH—, CO, CN, COOR or S, and X and Y or X' and Y' can each be closed to form a like or different isocyclic or heterocyclic ring. The reaction of phenolic aromatic compounds as for example α-naphthol with azides can also be expressed by this equation, since α-naphthol in the keto form corresponds to the general formula $XCH_2Y$.

The reaction is also suitable for the production of compounds which contain the group —N=N— several times in the molecule, for example

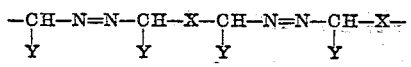

in a single stage by reacting a compound having at least two reactive groups, for example compounds with at least two methylene or methine groups, with the said azides. In the production of azo dyestuffs by diazotizing suitable amines and coupling to form coupling compounds, such as for example phenols or pyrazolones, this possibility generally does not exist. Moreover, when compounds containing amino groups, such as for example amino naphthols, are used, it is possible to arrive directly at an azo compound without it being necessary to protect the amino group, for example by acylation. The diazotization and coupling of many compounds containing amino groups, especially those which carry the amino groups on an aliphatic radical, such as for example ω-cyan-ω-amino-acetophenone, or such compounds as carry the amino group to be diazotized on a heterocyclic radical, is not possible in many cases, whereas this is possible with the process of the present invention. For example, it is particularly pointed out in U.S. Patent No. 2,447,867 that the diazotization and coupling of a 1-phenyl-3-alkyl-4-aminopyrazolone-5 is only possible when a sulpho group is in the para-position in the phenyl nucleus.

Using the process of the invention, it for example possible to produce in a particularly simple manner compounds such as those indicated below:

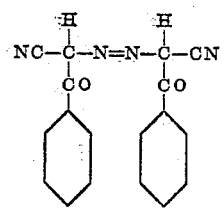

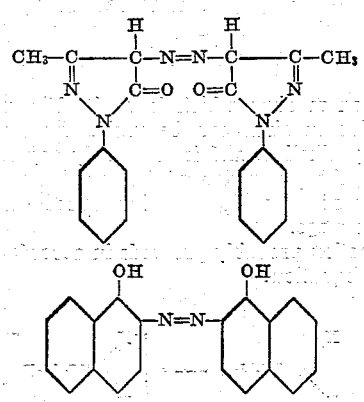

On the other hand, the above reaction offers the possibility of obtaining compounds with azo groups, the synthesis of which was formerly not possible. For example, no method has so far become known whereby it is possible to obtain a symmetrical azo compound having the Formula XI. (See the appended set of formulae.) This is however readily possible by using the process of the present invention whereby the components are preferably used in such amounts that one component is applied in a surplus of 10–50% as calculated on the theoretical molar relation.

Sulphonyl azides have proved to be particularly suitable for carrying out the process of the invention, since the reaction proceeds particularly smoothly and under mild conditions when these compounds are used.

EXAMPLE 1

A mixture of 7 g. of 1-phenyl-3-methyl-pyrazolone-5,
20 cc. of piperidine and
2.4 g. of phenyl azide is heated over a period of one hour to 80° C., whereafter it is diluted after cooling with 100 cc. of water, acidified with 10% hydrochloric acid and filtered with suction, and the residue is dissolved in and recrystallized from glacial acetic acid. The product is a brick-red, finely crystallized powder, M.P. 187° C., of the probable Formula I. Azido-formic acid esters (Journ. Chem. Soc., 93, p. 81) can be used instead of phenyl azide If the 1-phenyl-3-methyl-pyrazolone-5 is replaced by 3-phenylisoxazolone there are obtained red needle shaped crystals of the probable Formula XVI, M.P. 131° C.

EXAMPLE 2

11.2 g. of 1-(p-aminophenyl)-3-methyl-5-pyrazolone-hydrochloride are dissolved in 100 cc. of methanol, and 10 cc. of triethylamine and
4.5 g. of benzene sulphonyl azide (Journ. Praktische Chemie (2), 58/1898, p. 174) dissolved in
12.5 cc. of alcohol are added dropwise and stirred for 3 hours at room temperature. 100 cc. of 10% hydrochloric acid are then added dropwise and the mixture is filtered with suction; the residue is washed with 50% methanol and yields a yellow dye of the probable Formula II.

EXAMPLE 3

8.8 g. of dimethyl aminosulphonyl azide are dissoved in 150 cc. of alcohol, the solution is cooled to −15° C. and 8.7 g. of 1-phenyl-3-methyl pyrazolone dissolved in 100 cc. of alcohol and 3 cc. of triethylamine are added dropwise and stirred for 30 minutes, the resulting mixture then being added dropwise to the slightly reddish-colored solution obtained by dissolving 14.3 g. of 1-(p-chlorophenyl)-3-methyl pyrazolone-5 in 100 cc. of alcohol, and
5 cc. of triethylamine over a period of several hours, the temperature is raised to 15–20° C., and the mixture is stirred overnight and incorporated by stirring into 1000 cc. of 10% hydrochloric acid. The product is filtered with suction and the residue is washed with water and dried. The red dye obtained consists essentially of the compound having the Formula III.

The dimethyl aminosulphonyl azide is prepared by adding a solution of 14.5 g. dimethylaminosulphochloride in 20 cc. of acetone dropwise to a solution of 10 g. of sodium azide in 100 cc. of water at 25–30° C. After allowing to stand for 16 hours the azide is precipitated by adding 300 cc. of water. The oil which separates is distilled with steam.

EXAMPLE 4

5 g. of 1-phenyl-3-methylpyrazolone-5
25 cc. of methanol
50 g. of 2-chloro-5-sulphonyl azide benzoic acid and 1 g. of sodium acetate are stirred overnight, diluted with water and filtered with suction. The compound obtained has the Formula I.

The 2-chloro-5-sulphonyl azide is produced as follows:

A solution of 3.65 g. of sodium azide in 25 cc. of water is slowly added to a solution of 13.7 g. of 2-chlorobenzoic acid 5-sulphochloride in 15 cc. of methanol together with 29 cc. of a 10% aqueous sodium hydroxyde solution so as to keep the pH value of the reaction mixture at about 7. The reaction mixture is filtered over charcoal and acidified. The sulphonyl azide precipitates and is isolated by filtration. Melting point: 128–130° C.

EXAMPLE 5

10.5 g. of 3-carboxyl-1-phenyl-pyrazolone-5 are dissolved in 100 cc. of water and 43 cc. of 10% sodium hydroxide solution (pH=7 to 8)
5 g. of sodium azide are added, then
4 g. of methane sulphochloride are added dropwise over a period of 45–60 minutes at 25° C., and the mixture is stirred overnight. A magenta dye (Formula IV) is precipitated and this is filtered off with suction. A further quantity of dye can be salted out of the mother liquor by using sodium chloride.

EXAMPLE 6

26 g. of pyridyl-(2)pyrazolone-5 are dissolved in 100 cc. of alcohol. A solution of
5 g. of KOH in
20 cc. of methanol is added and, while stirring
12 g. of benzene sulphonic acid azide (which can also be called phenyl sulphonyl azide) dissolved in
25 cc of alcohol are added over a period of 15 minutes. The mixture is stirred for 30 minutes and the product, with the probable Formula V, is filtered off with suction and washed with alcohol. Melting point=175–176° C.

EXAMPLE 7

5 g. of β-naphthol are dissolved in
25 cc. of methanol and
3.5 cc. of triethylamine, and
5 g. of dimethylamino-sulphonyl azide are added dropwise. The mixture is left to stand overnight at room temperature, heated for 2 hours to boiling point, cooled and filtered with suction. Green prisms with a metallic lustre are obtained; these crystals conform to Formula VII, and change at 225° C. into needles which melt at 245–247° C. with evolution of gas.

EXAMPLE 8

3 g. of α-naphthol are dissolved in
25 cc. of methanol
3.2 g. of phenyl sulphonyl azide and
10 cc. of aqueous 10% sodium hydroxide solution are added, and after 1 hour 20 minutes the mixture is heated on a steam bath, cooled and filtered with suction. The resulting green crystals with a metallic lustre can be dissolved in methanol and reprecipitated with acetic acid, producing a red crystalline precipitate of the probable Formula VI. Melting point=225° C.

EXAMPLE 9

7 g. of 2,3-oxynaphthoic acid anilide are dissolved in
70 cc. of pyridine and
5 cc. of piperidine, and
2.5 g. of dimethyl aminosulphonyl azide dissolved in
10 cc. of methanol are added dropwise at 50–60° C. over a period of 2 hours. The resulting mixture is stirred for 1 hour at 60° C. and incorporated by stirring into 500 cc. of 10% hydrochloric acid, whereupon it is washed with methanol, first of all in the cold state and then in the hot state. A reddish-blue dye of the probable Formula VIII, which dissolves in methanolic alkali to give a green solution, is obtained.

EXAMPLE 10

7.5 g. of ω-cyano-acetophenone are dissolved in
25 cc. of methanol,
5 g. of benzene sulphonyl azide are added and
15 cc. of 25% methanolic KOH are added dropwise. The resulting mixture is stirred for 2 hours, acidified with dilute acetic acid and filtered with suction, and the residue is washed with water. Probable Formula IX.

EXAMPLE 11

5 g. of 1,3-(cyano-acetyl)-5-stearoyl aminobenzene are dissolved in
50 cc. of alcohol at 50° C.;
2 g. of benzene sulphonyl azide are added and
1 cc. of piperidine is added dropwise. The deep red deposit, of the probable Formula X, which precipitates is filtered off with suction and washed with alcohol.

EXAMPLE 12

5.6 g. of 1-naphthol-5-sulphonic acid are dissolved in
20 cc. of 10% sodium hydroxide solution and
1.7 g. of dimethyl aminosulphonyl azide dissolved in
5 cc. of methanol are added dropwise over a period of 2 hours. The resulting mixture is stirred overnight, mixed with 2 cc. of concentrated hydrochloric acid and filtered with suction, and the residue is washed with acetone. Black crystals with a metallic lustre and with the probable Formula XII are obtained, these dissolving in alkalies with a green color and in the acid range with a red color.

EXAMPLE 13

8.65 g. of 1,3,3-trimethyl-2-methylene indoline are dissolved in
50 cc. of methanol, and a solution of
8.8 g. of dimethyl aminosulphonyl azide in
15 cc. of methanol is added dropwise at −15° C. The resulting mixture is stirred for 1 hour, filtered and washed with ice-cooled methanol, and the precipitate is introduced at 0° C. into a mixture of 7 g. of trimethyl methylene indoline, 50 cc. of methanol and 10 cc. of glacial acetic acid. The temperature is allowed to rise to room temperature while stirring and the yellow precipitate obtained is filtered off with suction. The product, with the probable Formula XI, can be dissolved in and recrystalized from glacial acetic acid to give yellow cube-shaped crystals; melting point= 226–227° C. Instead of dimethylamino sulphonyl azide there may also be used 4.5 g. of carbamic acid azide whereby after the addition of the indoline solution the reaction mixture is heated for 50 minutes on a steam bath. The formed precipitate is sucked off and recrystallized from dioxane. There is obtained the same compound as by the first mentioned process.

EXAMPLE 14

17.5 g. of 1,3,3-trimethyl methylene indoline are dissolved in 100 cc. of methanol and the solution is cooled to −15° C.

17.6 g. of dimethyl aminosulphonyl azide dissolved in 15 cc. of methanol are added dropwise at −15° C. over a period of 30 minutes, and the precipitate formed is filtered off with suction and washed with ice-cold methanol.

7 g. of this product are introduced into a solution of
6.6 g. of 1-phenyl-3-methyl pyrazolone-5 and
3.3 g. of anhydrous oxalic acid in
50 cc. of methanol, and the mixture is stirred overnight and the crystalline precipitate is filtered off with suction. Crystals with a metallic lustre are formed, which dissolve to give a magenta color in methanol; the solution becomes yellow on acidification as well as upon being made alkaline. An additional quantity of dye can be isolated from the filtrate by diluting the water and adding 10% soda solution until the solution changes in color from red to violet. Melting point: 148–149° C. The product has the probable Formula XIII.

EXAMPLE 15

The crystalline precipitate obtained according to Example 13 from trimethylmethyleneindoline and for instance dimethyl aminosulphonyl azide, which has a melting point of 113° C. and the analytical composition conforming to an addition product of 1 mol of trimethylmethyleneindoline and 1 mol of dimethylaminosulphonyl azide is introduced with cooling into 15 times the amount by weight of the saturated solution of $SO_2$ in alcohol; the precipitate resulting after dissolution is filtered off with suction and washed with methanol. The product has the probable formula XIV; melting point=147° C.

In analogous manner the compound of the probable Formula XV, melting point=127° C. can be obtained if an alcoholic solution of benzene sulphonic acid is used instead of the alcoholic $SO_2$ solution.

EXAMPLE 16

9.1 cc. of cyanoethyl acetic acid are introduced into a solution of
2 g. sodium in
85 cc. of alcohol abs. and
13 g. of methane sulphonyl azide are added dropwise at −15° C. The resulting slightly yellow colored precipitate is filtered off with suction, dissolved in glacial acetic acid and re-precipitated with water. Rhombic crystals of the melting point 94–96° C. are obtained; the CH—N content of the crystals corresponding to the probable Formula XVII.

EXAMPLE 17

5.2 cc. of malonic acid diethylester are added dropwise at −15° C. into the solution of
2.3 g. of sodium in
100 cc. of alcohol abs. Thereafter
13 g. of methane sulphonyl azide are added dropwise. The initially obtained white colored precipitate re-dissolves towards the end of the reaction. The solution is rendered acid to Congo with concentrated hydrochloric acid with cooling. The precipitate formed, is filtered off with suction, thoroughly washed with water and re-crystallized from methanol in the wet state. Melting point=105–107° C. This product has the probable Formula XVIII.

8 g. of this product are heated with
5.2 g. of phenylmethylpyrazolone and
0.2 cc. of piperidine to 70° C. for 4 hours. The melt solidifying during the reaction is mixed with methanol with stirring, filtered off with suction and re-crystallized from glacial acetic acid. The compound is identical with the compound obtained according to Example 1.

EXAMPLE 18

9.7 g. of anthrone are dissolved in
75 cc. of pyridine and
2 cc. of piperidine,
6 cc. of methane sulphonyl azide are added and the solution is left standing at room temperature until orange-brown colored crystals form which are filtered off with suction and washed with methanol. The C, H and N content correspond to the compound of the Formula XIX. Melting point above 300° C. By heating with glacial acetic acid the compound is disproportionated into a sparingly soluble yellow colored substance which melts at 256° C., solidifies again immediately without melting up to 300° C. (this yellow compound corresponds to the Formula XX), and into a substance of the Formula XXI which is easily soluble in glacial acetic acid.

EXAMPLE 19

21 g. of p-nitrophenyl ethyl acetate are dissolved in
100 cc. of methanol,
13 g. of methane sulphonyl azide dissolved in
25 cc. of methanol are added dropwise. By addition of 10% methanolic caustic soda solution the color of the reaction solution is simultaneously kept red until the end of the reaction. After standing overnight, the yellow colored prismatic crystals are filtered off with suction and washed with methanol. The crystals melt between 140–145° C. and correspond to the probable Formula XXII.

*Index of formulae*

I 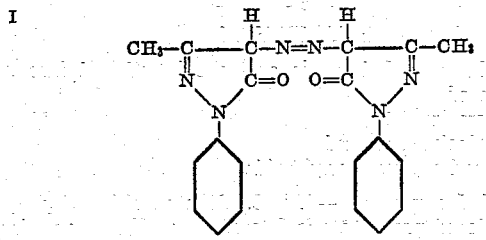

II 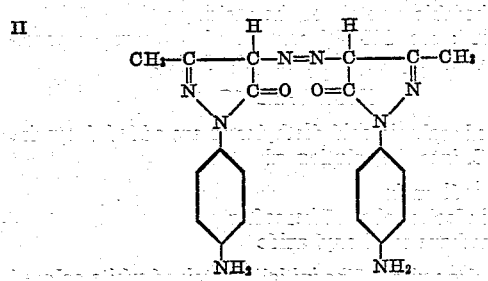

III 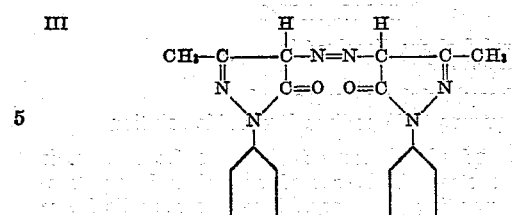

IV 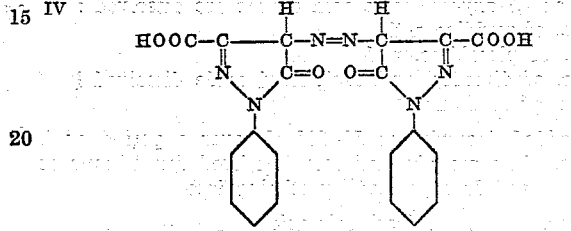

V 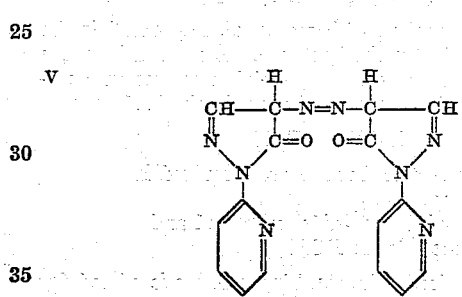

VI 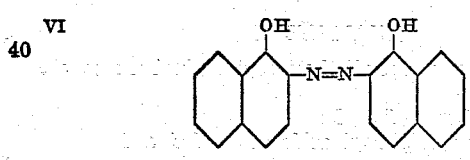

VII 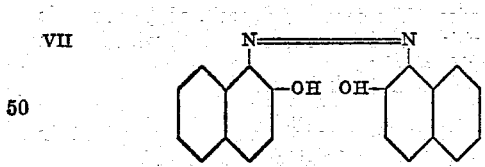

VIII 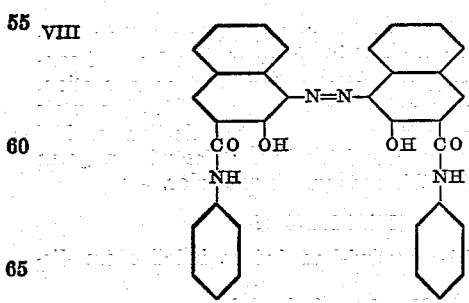

IX 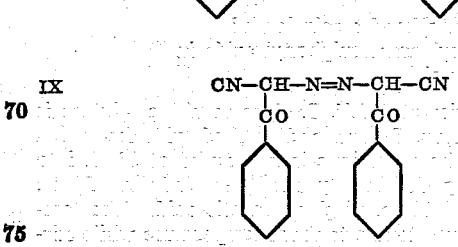

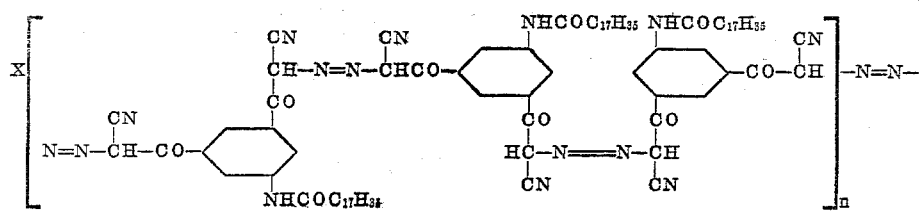

XI 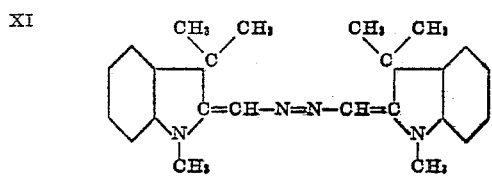

XII 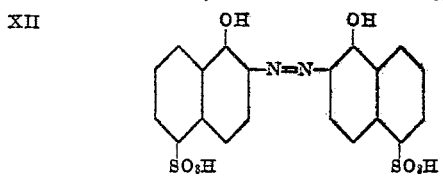

or 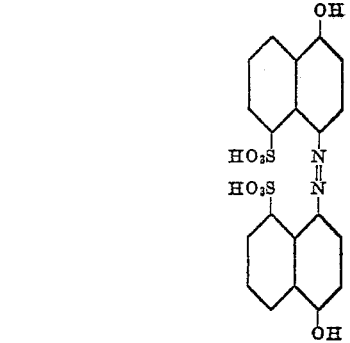

XIII 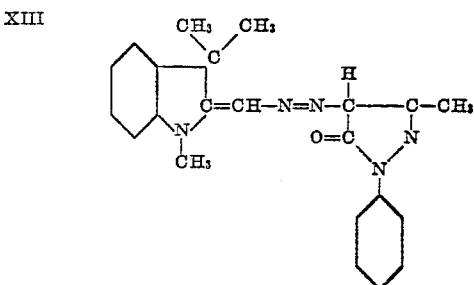

XIV 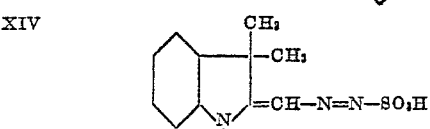

XV 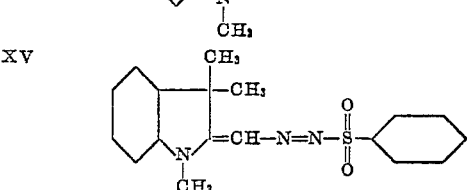

XVI 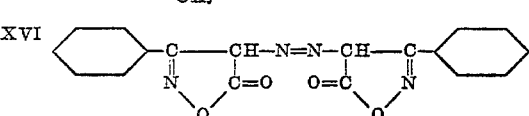

XVII 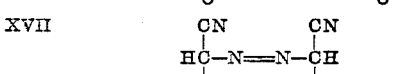

XVIII 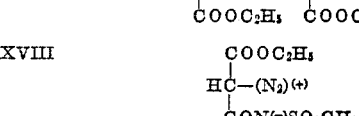

XIX 

XX   

XXI  

XXII   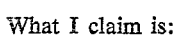 

What I claim is:

1. A process for the production of symmetrical and unsymmetrical azo compounds, wherein an organic compound containing at least one reactive group of the class consisting of reactive methylene and reactive methine groups, is reacted in dissolved condition with a sulfonyl azide to cause the azide grouping to couple two of said reactive groups together through an azo bridge, and form as a by-product a compound having an amine group in place of the azide group of the sulfonyl azide, said sulfonyl azide having the formula $Z.SO_2.N_3$ in which Z stands for a radical selected from the group consisting of alkyl and aryl radicals as well as a radical of the formula $$\begin{array}{c} R_1 \\ \diagdown \\ N- \\ \diagup \\ R_2 \end{array}$$

in which $R_1$ and $R_2$ stand for alkyl groups.

2. A process according to claim 1, wherein the sulfonyl azide is reacted at a pH value of 5 to 12 with a cyclic compound containing an active methylene group.

3. A process according to claim 1, wherein the sulfonyl azide is reacted at a pH value of 5 to 12 with a phenolic compound unsubstituted in a position selected from the class consisting of the ortho- and para-positions with respect to the phenolic hydroxyl group.

4. A process as defined by claim 1 in which the reaction is only carried out long enough for the azide to combine with one of the reactive groups.

5. A process for making unsymmetrical azo compounds, which process is characterized by the steps of reacting two different organic compounds each containing a reactive group of the class consisting of reactive methylene and reactive methine groups, with an organic azide corresponding to the general formula RN₃, in which R stands for a radical selected from the group consisting of aliphatic, aromatic, aliphatic sulfonyl, and aromatic sulphonyl radicals, to cause the azide grouping to react with and couple together with an azo bridge two of said reactive groups from the respective compounds and form a by-product compound having the formula RNH₂ where R is as above defined.

6. A process for the production of a polymeric polyazo product, wherein an organic compound containing a plurality of reactive groups of the class consisting of reactive methylene and reactive methine groups, is reacted in dissolved condition with an organic azide corresponding to the general formula RN₃, in which R stands for a radical selected from the group consisting of an aliphatic, an aromatic, an aliphatic sulfonyl and an aromatic sulphonyl radical, to cause the azide grouping to chain molecules of the compound together through azo bridges substituted in the reactive groups and form a by-product compound having the formula RNH₂ where R is as above defined.

7. A process for the production of the compound having the formula:

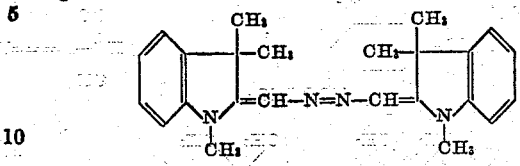

said process comprising reacting 1,3,3-trimethyl-2-methylene indoline in dissolved condition with an organic azide corresponding to the general formula RN₃, in which R stands for a radical selected from the group consisting of an aliphatic, an aromatic, an aralkyl aliphatic sulfonyl, and an aromatic sulphonyl radical, to cause the azide grouping to couple together two molecules of the indoline by an azo bridge substituted on the methylene portion of each indoline and form a by-product compound having the formula RNH₂ where R is as above defined.

References Cited in the file of this patent

Boyer et al.: Chem. Reviews, vol. 54, pp. 45 and 46 (1954).

Wheland: Advanced Organic Chemistry, 2nd ed., p. 487 (1954).

UNITED STATES PATENT OFFICE
Certificate of Correction

Patent No. 2,950,273　　　　　　　　　　　　　　　　　　　　August 23, 1960

Willibald Pelz

It is hereby certified that error appears in the above numbered patent requiring correction and that the said Letters Patent should read as corrected below.

Column 9, lines 9 to 15, Formula XI should appear as shown below instead of as in the patent:

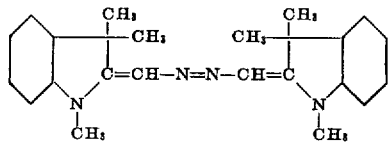

same column 9, lines 39 to 50, Formula XIII should appear as shown below instead of as in the patent:

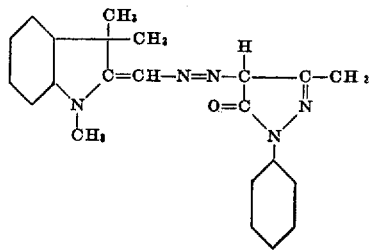

column 12, line 16, strike out "aralkyl".

Signed and sealed this 22nd day of August 1961.

[SEAL]

Attest:
ERNEST W. SWIDER,
*Attesting Officer.*

DAVID L. LADD,
*Commissioner of Patents.*